(12) United States Patent
Ishida et al.

(10) Patent No.: US 10,946,532 B2
(45) Date of Patent: Mar. 16, 2021

(54) GRIPPING TOOL AND GRIPPING SYSTEM

(71) Applicant: KABUSHIKI KAISHA TOSHIBA, Minato-ku (JP)

(72) Inventors: Emiko Ishida, Yokohama (JP); Hiromasa Takahashi, Minato (JP); Takeshi Toyoshima, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 33 days.

(21) Appl. No.: 16/360,854

(22) Filed: Mar. 21, 2019

(65) Prior Publication Data

US 2019/0217482 A1    Jul. 18, 2019

Related U.S. Application Data

(63) Continuation of application No. PCT/JP2017/034442, filed on Sep. 25, 2017.

(30) Foreign Application Priority Data

Mar. 13, 2017    (JP) .............................. JP2017-047892

(51) Int. Cl.
*B25J 15/00* (2006.01)
*B25J 15/12* (2006.01)
(Continued)

(52) U.S. Cl.
CPC ........... *B25J 15/0033* (2013.01); *B23P 19/04* (2013.01); *B25J 15/0023* (2013.01);
(Continued)

(58) Field of Classification Search
CPC ................ B25J 15/0033; B25J 15/0608; B25J 15/0023; B25J 15/08; B25J 15/0009;
(Continued)

(56) References Cited

U.S. PATENT DOCUMENTS 3,306,646 A * 2/1967 Flora, Jr. ................. B66C 1/427
294/2
6,846,029 B1 * 1/2005 Ragner ..................... B25B 9/00
294/219
(Continued)

FOREIGN PATENT DOCUMENTS

JP    5-67485 A    9/1993
JP    7-76422 A    3/1995
(Continued)

OTHER PUBLICATIONS

International Search Report dated Nov. 21, 2017 in PCT/JP2017/034442, filed on Sep. 25, 2017 (with English Translation).
(Continued)

*Primary Examiner* — Stephen A Vu
(74) *Attorney, Agent, or Firm* — Oblon, McClelland, Maier & Neustadt, L.L.P.

(57) ABSTRACT

According to one embodiment, a gripping tool includes a gripper and a suction pad. The gripper is flexible. A granular material is provided in an interior of the gripper. The suction pad includes a pad portion and a pipe-shaped member and is surrounded with the gripper. The pad portion suctions a workpiece. The pipe-shaped member is connected to the pad portion. The suction pad is movable with respect to the gripper in a first direction. The first direction is from the pad portion toward the pipe-shaped member.

18 Claims, 9 Drawing Sheets

(51) Int. Cl.
*B23P 19/04* (2006.01)
*B25J 15/06* (2006.01)
*B65G 47/90* (2006.01)
*B65G 47/91* (2006.01)
*B25J 15/08* (2006.01)

(52) U.S. Cl.
CPC ......... *B25J 15/0028* (2013.01); *B25J 15/06* (2013.01); *B25J 15/08* (2013.01); *B25J 15/12* (2013.01); *B65G 47/908* (2013.01); *B65G 47/91* (2013.01); *B65G 47/90* (2013.01)

(58) Field of Classification Search
CPC .... B25J 15/0246; B25J 15/0616; B25J 15/06; B25J 9/14; B25J 15/12; B25J 15/0028; A61F 2/586; A61F 2/588; B29C 43/18; B29C 43/183; B29L 2031/748; D01D 5/0007; D01D 5/0076; B23P 19/04; B65G 47/908; B65G 47/91; B65G 47/90
See application file for complete search history.

(56) References Cited

U.S. PATENT DOCUMENTS

| | | | |
|---|---|---|---|
| 8,132,835 B2* | 3/2012 | Ban | B25J 15/0616 |
| | | | 294/183 |
| 8,548,626 B2* | 10/2013 | Steitz | B25J 15/0023 |
| | | | 294/192 |
| 2013/0033050 A1 | 2/2013 | Matsuoka et al. | |
| 2015/0190929 A1 | 7/2015 | Matsuoka | |

FOREIGN PATENT DOCUMENTS

| | | |
|---|---|---|
| JP | 9-38883 A | 2/1997 |
| JP | 4469110 | 5/2010 |
| JP | 2012-176476 | 9/2012 |
| JP | 5130320 | 1/2013 |
| JP | 5408102 | 2/2014 |
| JP | 5434779 | 3/2014 |
| JP | 5762758 | 8/2015 |
| JP | 5780388 | 9/2015 |
| JP | 5800127 | 10/2015 |
| JP | 5822110 | 11/2015 |
| JP | 5841101 | 1/2016 |
| JP | 5843212 | 1/2016 |
| JP | 5846057 | 1/2016 |
| JP | 5900838 | 4/2016 |
| JP | 2016-97496 | 5/2016 |
| JP | 5930209 | 6/2016 |
| JP | 5979584 | 8/2016 |
| JP | 6010408 | 10/2016 |

OTHER PUBLICATIONS

Written Opinion dated Nov. 21, 2017 in PCT/JP2017/034442, filed on Sep. 25, 2017.
International Search Report dated Nov. 21, 2017 in PCT/JP2017/034442 (with English translation), 5 pages.

* cited by examiner

GRIPPING TOOL AND GRIPPING SYSTEM

CROSS-REFERENCE TO RELATED APPLICATIONS

This is a continuation application of International Application PCT/JP2017/034442, filed on Sep. 25, 2017. This application also claims priority to Japanese Application No. 2017-047892, filed on Mar. 13, 2017. The entire contents are incorporated herein by reference.

FIELD

Embodiments described herein relate generally to a gripping tool and a gripping system.

BACKGROUND

There is a gripping tool that includes a gripper. A granular material is provided in the interior of the gripper. The gripping tool causes the gripper to contact a workpiece to be gripped. The gripping tool suctions the workpiece; and the interior of the gripper is solidified by depressurizing. The workpiece is gripped thereby. It is desirable for the gripping tool to be able to grip objects of various shapes and properties with a high gripping force.

DETAILED DESCRIPTION

Figure 1:
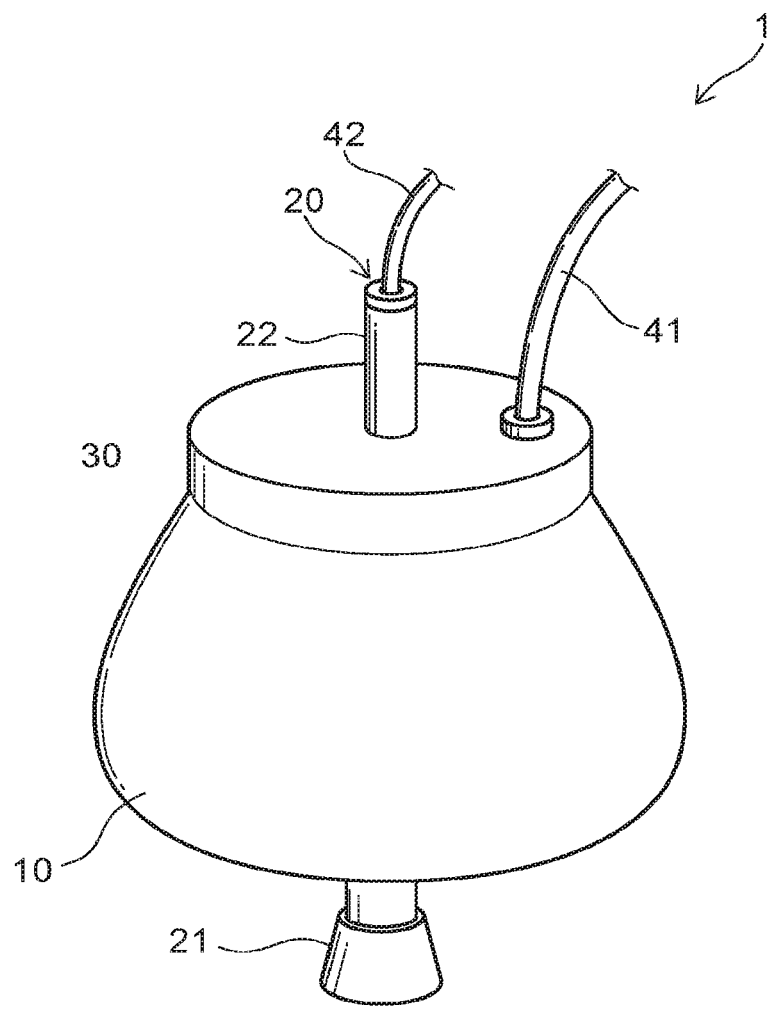
FIG. 1 is a perspective view illustrating a portion of a gripping tool according to a first embodiment.

According to one embodiment, a gripping tool includes a gripper and a suction pad. The gripper is flexible. A granular material is provided in an interior of the gripper. The suction pad includes a pad portion and a pipe-shaped member and is surrounded with the gripper. The pad portion suctions a workpiece. The pipe-shaped member is connected to the pad portion. The suction pad is movable with respect to the gripper in a first direction. The first direction is from the pad portion toward the pipe-shaped member.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIRST EMBODIMENT

FIG. 1 is a perspective view illustrating a portion of a gripping tool 1 according to a first embodiment.

Figure 2:
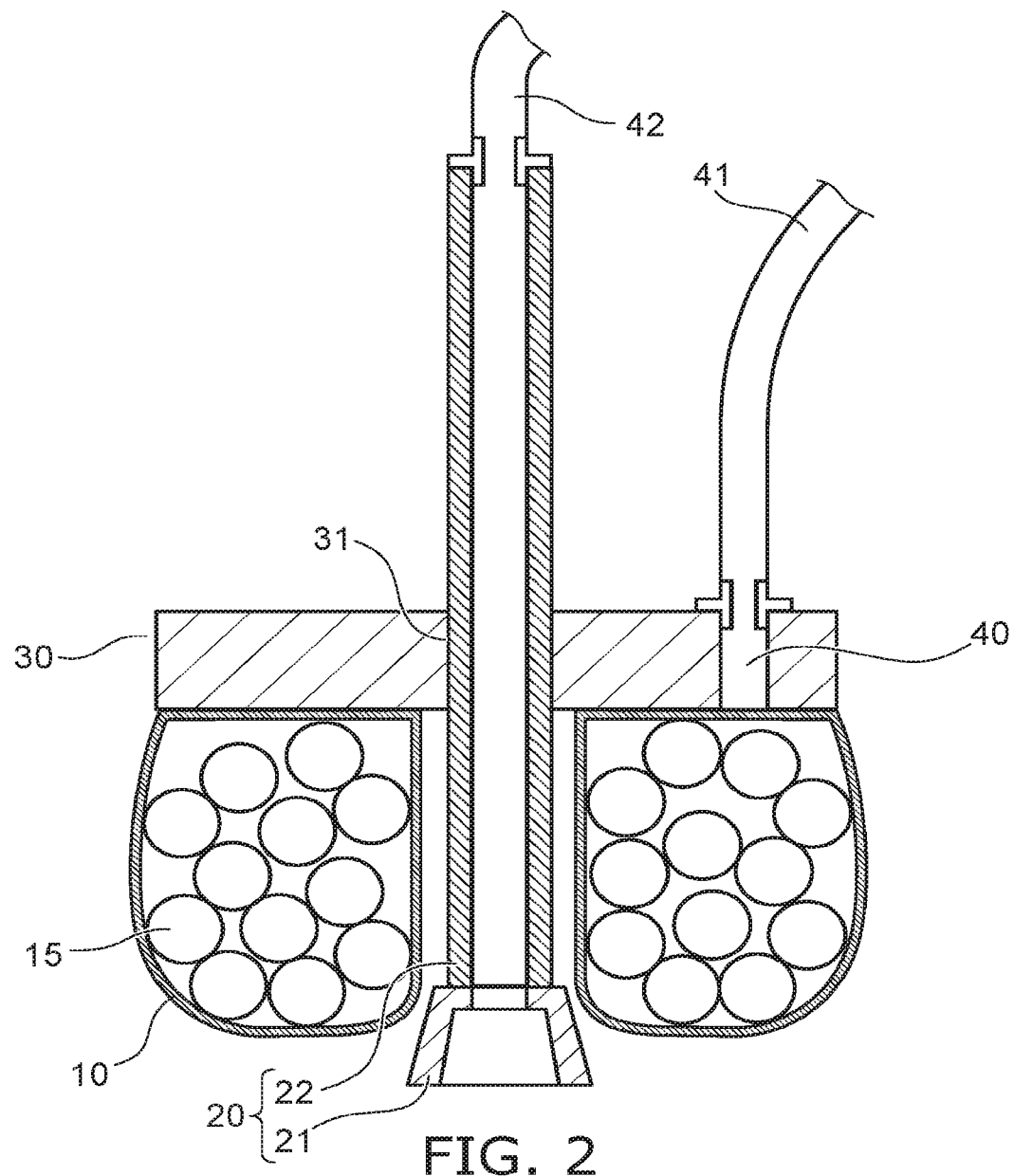
FIG. 2 is a cross-sectional view illustrating a portion of the gripping tool according to the first embodiment.

FIG. 2 is a cross-sectional view illustrating a portion of the gripping tool 1 according to the first embodiment.

Figure 3:
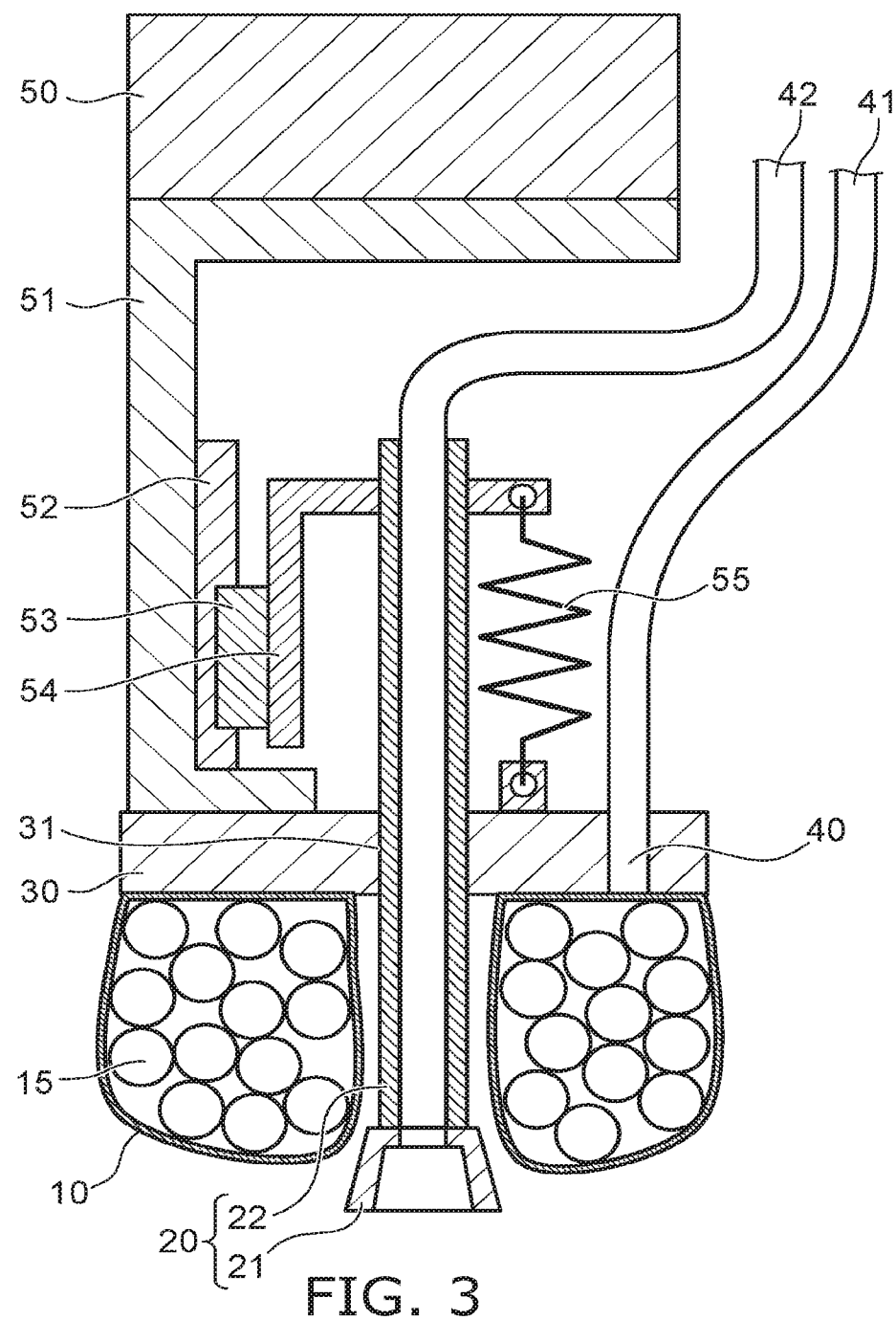
FIG. 3 is a schematic cross-sectional view illustrating the gripping tool according to the first embodiment.

FIG. 3 is a schematic cross-sectional view illustrating the gripping tool 1 according to the first embodiment.

As illustrated in FIG. 1 and FIG. 2, the gripping tool 1 according to the first embodiment includes a gripper 10 and a suction pad 20.

The gripper 10 has a toroidal configuration. The gripper 10 is flexible. As illustrated in FIG. 2, a granular material 15 is provided in the interior of the gripper 10. The gripper 10 is held by a holder 30. The suction pad 20 is provided inside the gripper 10. The suction pad 20 is surrounded with the gripper 10. The suction pad 20 is configured to be movable with respect to the gripper 10 and the holder 30.

More specifically, the suction pad 20 includes a pad portion 21 and a pipe-shaped member 22. The pipe-shaped member 22 is inserted through a hole 31 formed in the holder 30. The pad portion 21 is connected to one end of the pipe-shaped member 22. The pipe-shaped member 22 slides inside the hole 31 in a direction of a line connecting the pad portion 21 and the pipe-shaped member 22. Thereby, the suction pad 20 moves with respect to the gripper 10 in the direction of the line.

The direction of the line connecting the pad portion 21 and the pipe-shaped member 22 is, for example, the vertical direction. The direction of the line connecting the pad portion 21 and the pipe-shaped member 22 includes a first direction (up) from the pad portion 21 toward the pipe-shaped member 22, and a second direction (down) from the pipe-shaped member 22 toward the pad portion 21. Hereinbelow, the description of the embodiments is performed using "vertical direction," "up/above," and "down/below" based on the positional relationship between the pad portion 21 and the pipe-shaped member 22.

An exhaust port 40 is provided in the gripper 10 and the holder 30. The exhaust port 40 is connected to the interior space of the gripper 10. A first pipe 41 for depressurizing the interior space of the gripper 10 is connected to the exhaust port 40. A second pipe 42 for suctioning the air via the pad portion 21 is connected to the other end of the pipe-shaped member 22 of the suction pad 20.

The gripper 10 includes, for example, a high polymer material such as a silicone resin, a rubber material, an acrylic resin, etc. The granular material 15 may include, for example, microbeads, silicone resin beads, coffee beans, glass beads, etc.

As illustrated in FIG. 3, the holder 30 is linked to a robot 50 via a link member 51. The gripping tool 1 is moved upward or downward by the operation of the robot 50. A guide mechanism 52 and a sliding member 53 are provided in the link member 51. The guide mechanism 52 is fixed to the link member 51. The sliding member 53 slides in the vertical direction along the guide mechanism 52. The sliding member 53 is fixed to the suction pad 20 by a fixing member 54.

In other words, the guide mechanism 52 is fixed with respect to the gripper 10. The sliding member 53 is fixed with respect to the suction pad 20. Therefore, the sliding member 53 slides in the vertical direction along the guide mechanism 52 when the suction pad 20 moves in the vertical direction.

An elastic member 55 is provided between the fixing member 54 and the holder 30. For example, in the initial state, the elastic member 55 is pulled from the equilibrium length. In the initial state, the gripper 10 and the suction pad 20 do not contact the workpiece to be gripped. In the initial state, the sliding member 53 has slid downward to the position of the limit of the guide mechanism 52. In the initial state, the sliding member 53 is locked by a not-illustrated stopper provided in the guide mechanism 52.

The elastic force that is generated by the elastic member 55 is balanced with the resisting force generated by the guide mechanism 52 and the sliding member 53. The suction pad 20 is urged by a force applied downward with respect to the gripper 10 and the holder 30.

A gripping method using the gripping tool 1 according to the first embodiment will now be described with reference to FIGS. 4A to 4D.

FIGS. 4A to 4D are cross-sectional views illustrating the gripping method using the gripping tool 1 according to the first embodiment.

The first pipe 41 and the second pipe 42 are not illustrated in FIGS. 4A to 4D.

Figure 4A:
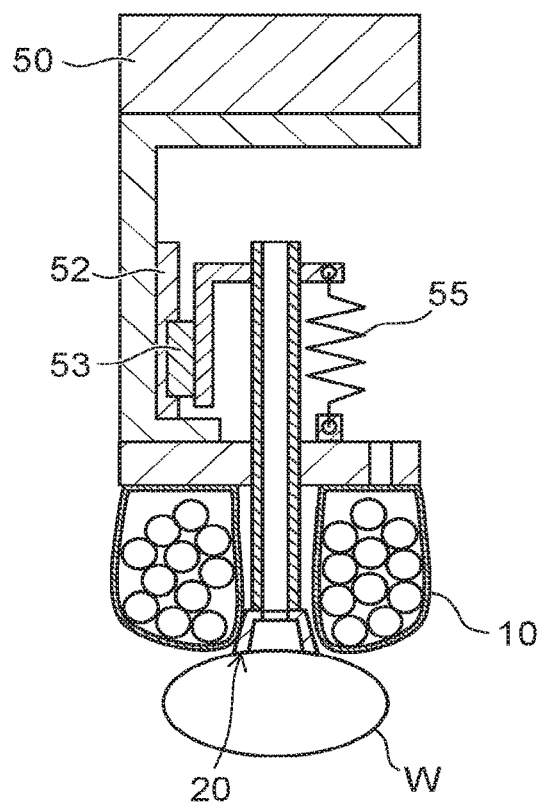
FIGS. 4A to 4D are cross-sectional views illustrating the gripping method using the gripping tool according to the first embodiment.

First, in the initial state illustrated in FIG. 3, the gripping tool 1 is moved above a workpiece W to be gripped. Then, the gripping tool 1 is lowered toward the workpiece W. As illustrated in FIG. 4A, the suction pad 20 contacts the workpiece W. The gripping tool 1 is lowered further from this state. Air is suctioned via the suction pad 20 while the suction pad 20 is pressed toward the workpiece W. The workpiece W is suctioned thereby.

Figure 4B:
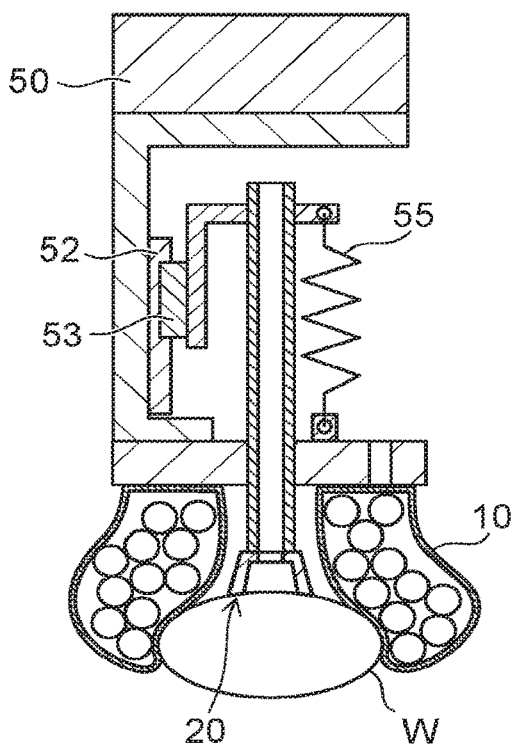

As described above, the suction pad 20 is urged downward with respect to the gripper 10. When the gripping tool 1 is lowered, a resisting force from the workpiece W is applied to the suction pad 20. In the initial state, the elastic member 55 generates an elastic force. When the resisting force becomes larger than the elastic force, the elastic member 55 elongates; and the sliding member 53 slides upward. At this time, the suction pad 20 moves upward with respect to the gripper 10. Thereby, the pad portion 21 of the suction pad 20 moves higher than the lower end of the gripper 10. As illustrated in FIG. 4B, the gripper 10 contacts the outer perimeter of the workpiece W.

Figure 4C:
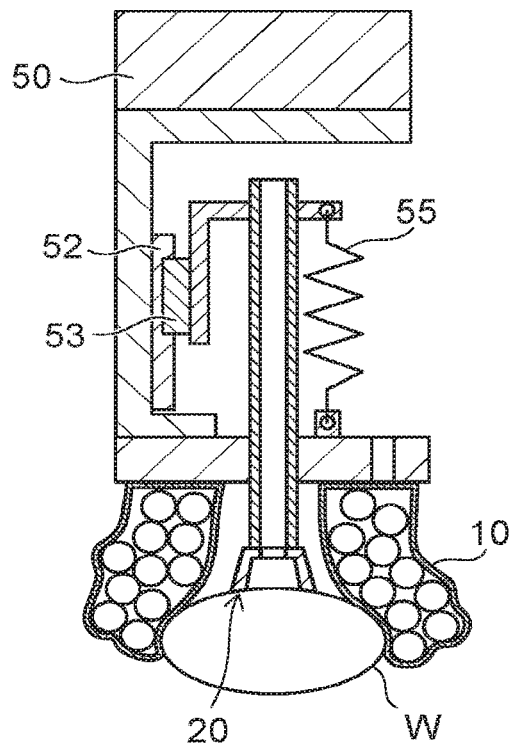
Figure 4D:
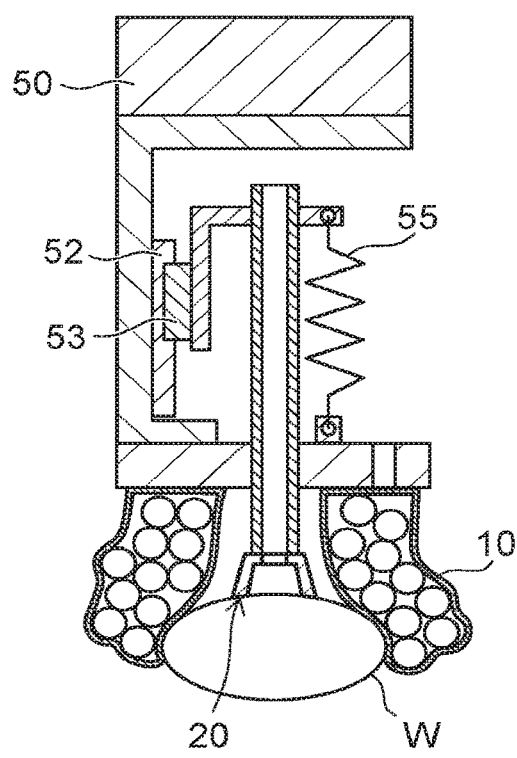

The gripper 10 contacts the workpiece W and deforms to conform to the exterior form of the workpiece W. As illustrated in FIG. 4C, the interior of the gripper 10 is depressurized in this state. Thereby, the gripper 10 is solidified to conform to the shape of the workpiece W. The workpiece W that is suctioned by the suction pad 20 is gripped by a larger force. After the workpiece W is gripped by the gripper 10 and the suction pad 20, the gripping tool 1 is raised as illustrated in FIG. 4D. The workpiece W is transferred to the prescribed position.

Effects of the invention according to the first embodiment will now be described with reference to FIGS. 5A and 5B.

Figure 5A:
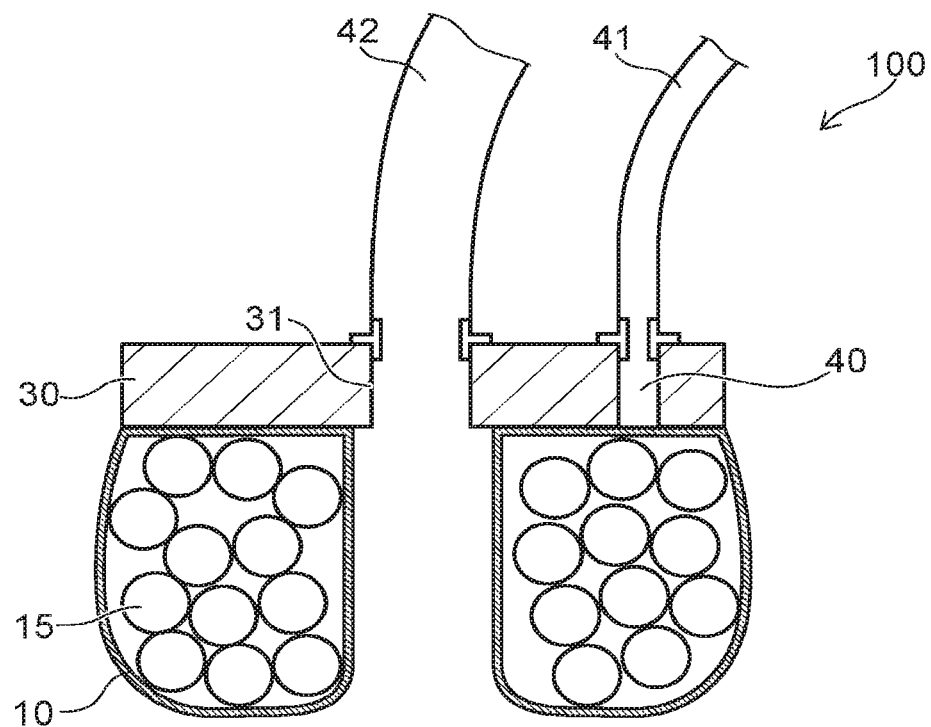
FIGS. 5A and 5B are cross-sectional views illustrating a portion of a gripping tool according to a reference example.
Figure 5B:
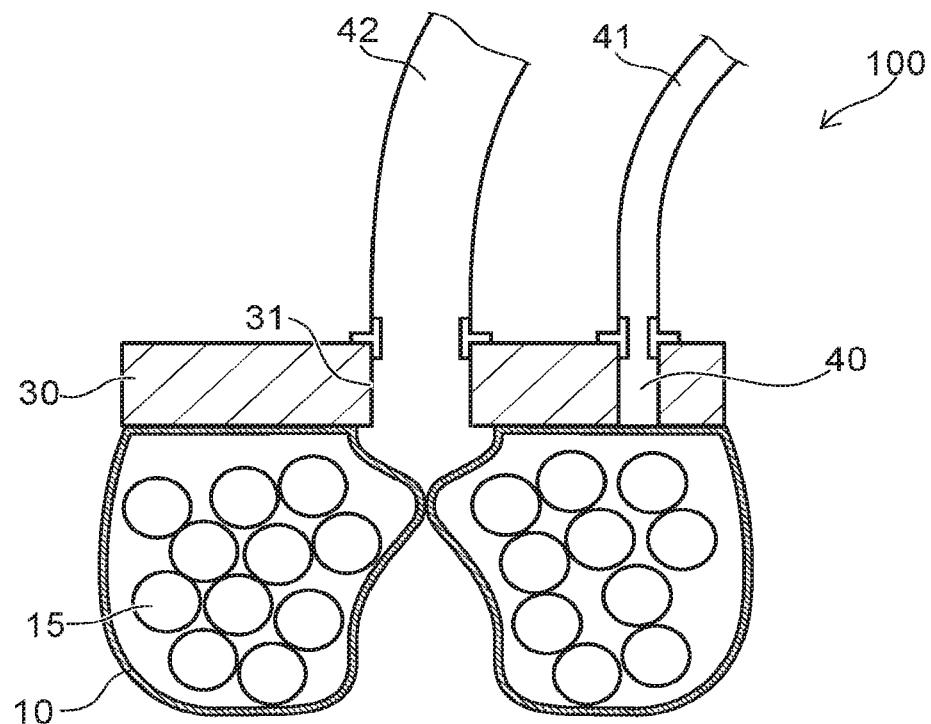

FIGS. 5A and 5B are cross-sectional views illustrating a portion of a gripping tool 100 according to a reference example.

The gripping tool 100 according to the reference example differs from the gripping tool 1 according to the first embodiment in that the suction pad 20 is not included. In the gripping tool 100, the second pipe 42 is directly connected to the hole 31 of the holder 30. The space that is surrounded with the gripper 10 is depressurized via the hole 31 and the second pipe 42. Thereby, the workpiece to be gripped is suctioned by the gripper 10.

For example, in the case where the workpiece is air-permeable, it is difficult to generate a pressure difference between the external space and the space surrounded with the gripper 10 and the workpiece. When the suction amount of the gripping tool is small, the workpiece cannot be suctioned sufficiently. In the case where the workpiece is soft, the workpiece deforms after being gripped. Air leaks through gaps occurring due to the deformation. Therefore, it is difficult for the gripper 10 to grip the workpiece. Accordingly, in such cases, it is desirable to increase the gripping force by strongly suctioning the workpiece. The gripping force of the gripping tool can be increased by increasing the suction amount per unit time suctioned via the second pipe 42.

For example, in the gripping tool 100 according to the reference example, the suction amount of the second pipe 42 is increased. In such a case, as illustrated in FIG. 5B, the gripper 10 is pulled by suction toward the second pipe 42. The hole 31 is sealed; and the workpiece cannot be suctioned. Therefore, in the gripping tool 100 according to the reference example, the suction amount cannot be increased. It is difficult for the gripping tool 100 to grip air-permeable workpieces and/or soft workpieces.

The suction pad 20 is provided in the gripping tool 1 according to the embodiment. By suctioning a gas via the suction pad 20, the gripper 10 is not sucked in easily compared to the case where the gas is suctioned via the hole 31 of the holder 30.

The suction pad 20 is movable upward with respect to the gripper 10. Therefore, for example, in the case where the suction pad 20 is pressed by contacting the gripping object, the suction pad 20 moves upward with respect to the gripper 10. For example, the suction pad 20 is positioned further downward to prevent the gripper 10 from being sucked-in. Even in such a case, the suction pad 20 does not easily impede the contact between the gripper 10 and the gripping object.

In other words, according to the embodiment, the gripping force due to the gripper 10 and the suction pad 20 can be increased while preventing the gripper 10 from being sucked-in; and more diverse workpieces can be gripped.

More desirably, as illustrated in FIG. 3, the pad portion 21 of the suction pad 20 is positioned lower than the gripper 10 (further in the second direction) in the state in which the pad portion 21 does not contact the workpiece. According to this configuration, when the air is suctioned via the suction pad 20, the suctioning of the gripper 10 can be prevented more reliably.

An example is described in FIG. 1 to FIG. 4D in which the suction pad 20 is linked to the gripper 10 and the holder 30 via the guide mechanism 52 and the sliding member 53. The gripping tool 1 according to the embodiment is not limited thereto. For example, the suction pad 20 may be linked to another robot different from the robot 50; and the raising and lowering of the suction pad 20 may be controlled by the other robot.

The suction pad 20 is linked to the gripper 10 via the guide mechanism 52 and the sliding member 53. Thereby, the suction pad 20 can be moved with respect to the gripper 10 according to the pressing on the workpiece by the suction pad 20. Accordingly, the other robot for moving the suction pad 20 is unnecessary. The configuration of the gripping tool 1 is simpler. The gripping tool 1 can be downsized.

The suction pad 20 is urged downward with respect to the gripper 10. Thereby, when the suction pad 20 is pressed by the workpiece, the sliding of the suction pad 20 due to the resisting force from the workpiece can be suppressed. In other words, the suction pad 20 can be pressed onto the workpiece with a larger force. The air can be suctioned via the suction pad 20 in the state in which the suction pad 20 is in close contact with the workpiece; and the holding force of the suction pad 20 can be increased.

SECOND EMBODIMENT

Figure 6:
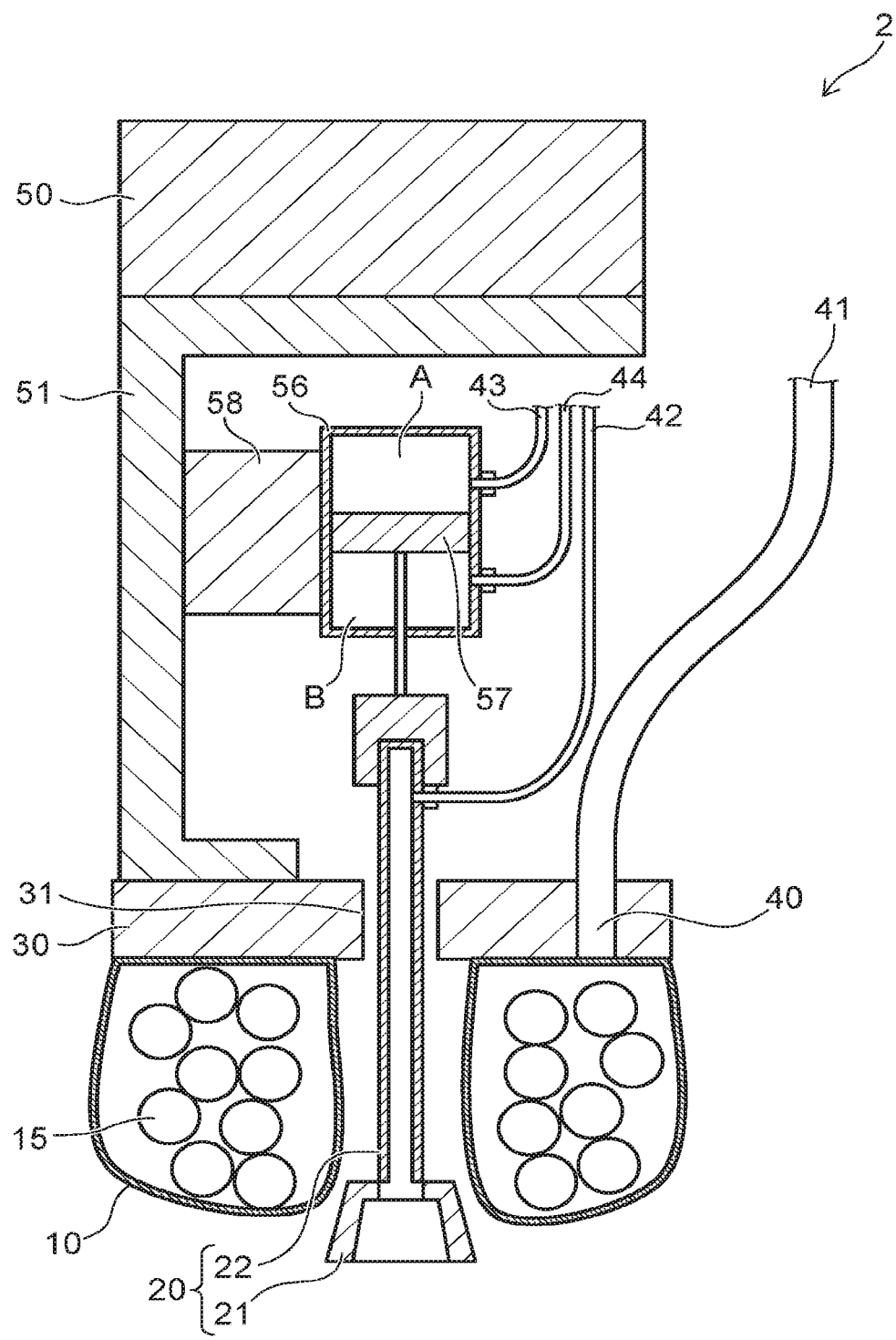
FIG. 6 is a schematic cross-sectional view illustrating a gripping tool according to a second embodiment.

FIG. 6 is a schematic cross-sectional view illustrating a gripping tool 2 according to a second embodiment.

The gripping tool 2 according to the second embodiment differs from the gripping tool 1 according to the first embodiment in that a cylinder 56 is included instead of the guide mechanism 52, the sliding member 53, the fixing member 54, and the elastic member 55.

The cylinder 56 is fixed to the link member 51 via a fixing member 58. In other words, the cylinder 56 is fixed with respect to the gripper 10 and the holder 30. The cylinder 56 is raised or lowered with the gripper 10. The upper end of the cylinder 56 is closed. A piston 57 is inserted into the cylinder 56 from below. The piston 57 is linked to the suction pad 20. The space inside the cylinder 56 is divided into a space A and a space B by the piston 57. The spaces A and B are airtight with respect to the external space. A pipe 43 is connected to the space A. A pipe 44 is connected to the space B. Air is provided to the spaces A and B or released from the spaces A and B via the pipes 43 and 44. The piston 57 can be caused to slide upward or downward inside the cylinder 56 by adjusting the pressure in these spaces. In other words, by adjusting the pressure in the spaces A and B, the suction pad 20 can be moved upward or downward.

The gripping tool 2 is lowered; and the suction pad 20 is caused to press the workpiece. The suction pad 20 moves upward with respect to the cylinder 56. At this time, air is introduced to the space A inside the cylinder 56. The suction pad 20 is pressed downward. In other words, the cylinder 56 of the gripping tool 2 according to the embodiment has a function similar to that of the guide mechanism 52 and the sliding member 53 of the gripping tool 1 according to the first embodiment. When the workpiece is to be gripped using only the gripper 10 without using the suction pad 20, air is introduced to the space B inside the cylinder 56. Thereby, the suction pad 20 can be moved upward. When the workpiece is to be gripped using only the suction pad 20 without using the gripper 10, air is introduced to the space A inside the cylinder 56 while pressing the suction pad 20 onto the workpiece. Thereby, the upward movement of the suction pad 20 can be suppressed; and only the suction pad 20 can be caused to contact the workpiece.

According to the embodiment as described above, similarly to the first embodiment, the configuration of the gripping tool 2 can be simpler. The gripping tool 2 can be downsized. When gripping the workpiece according to the embodiment, it is possible to appropriately select whether to use one of the gripper 10 or the suction pad 20 or both.

THIRD EMBODIMENT

Figure 7:
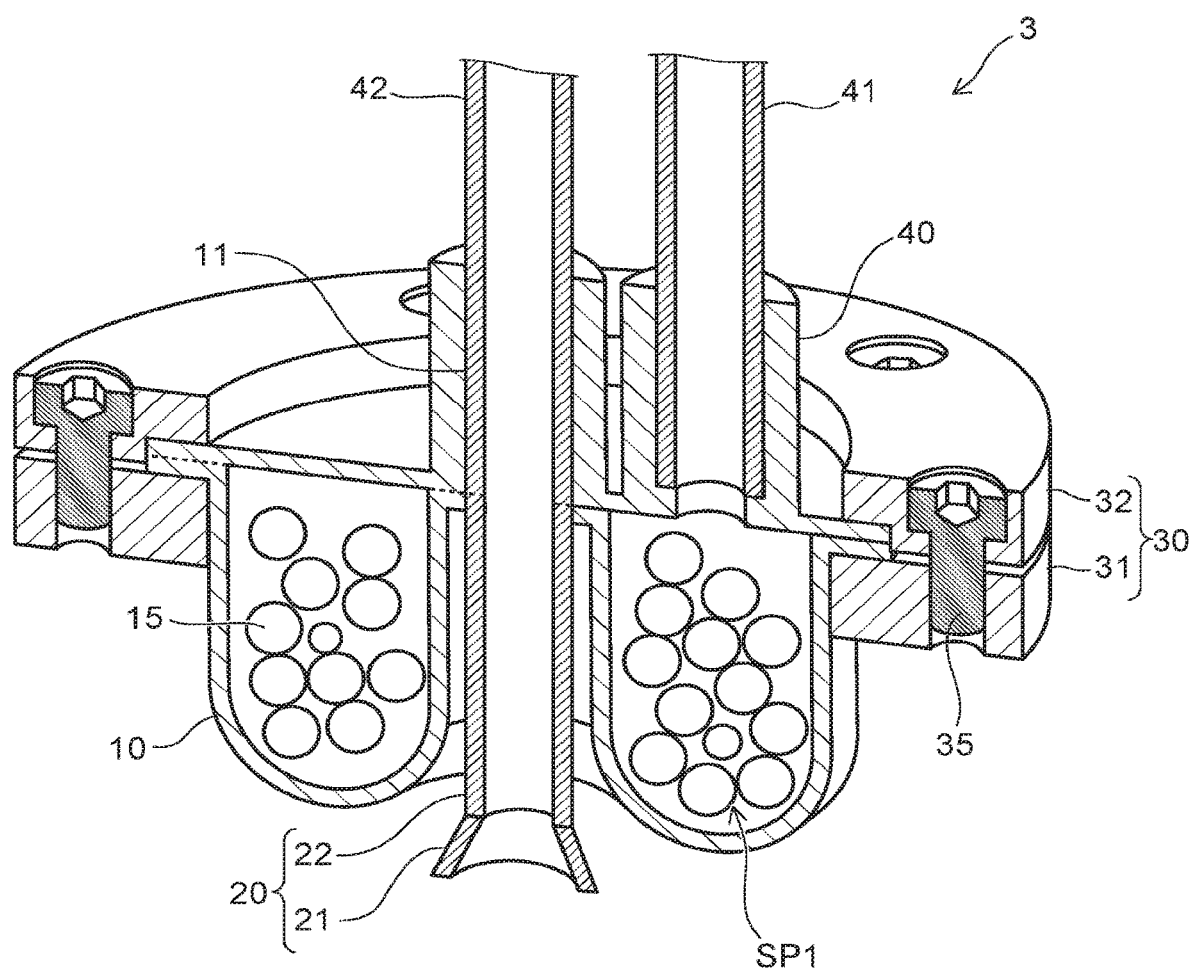
FIG. 7 is a perspective cross-sectional view illustrating a portion of a gripping tool according to a third embodiment.

FIG. 7 is a perspective cross-sectional view illustrating a portion of a gripping tool 3 according to a third embodiment.

The structure of the holder 30 of the gripping tool 3 according to the third embodiment is different from that of the gripping tool 1 according to the first embodiment. The gripping tool 3 is similar to the gripping tool 1 other than the suction pad 20 being movable upward with respect to the gripper 10, etc.

As illustrated in FIG. 7, the holder 30 holds the outer perimeter of the gripper 10. The suction pad 20 is inserted through a hole 11 formed in the center of the gripper 10. Because the holder 30 holds the outer perimeter of the gripper 10, the gripper 10 can deform upward inside the holder 30.

Figure 8A:
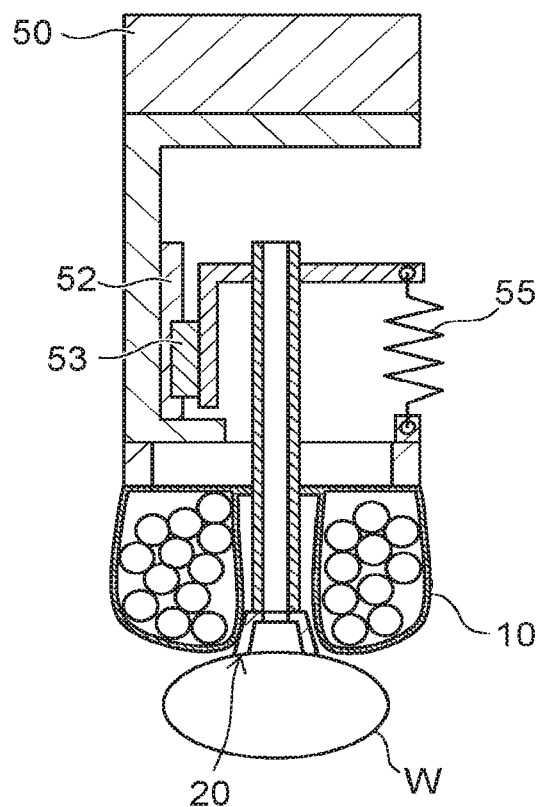
FIGS. 8A to 8C are schematic cross-sectional views illustrating the gripping mechanism of the gripping tool according to the third embodiment.
Figure 8B:
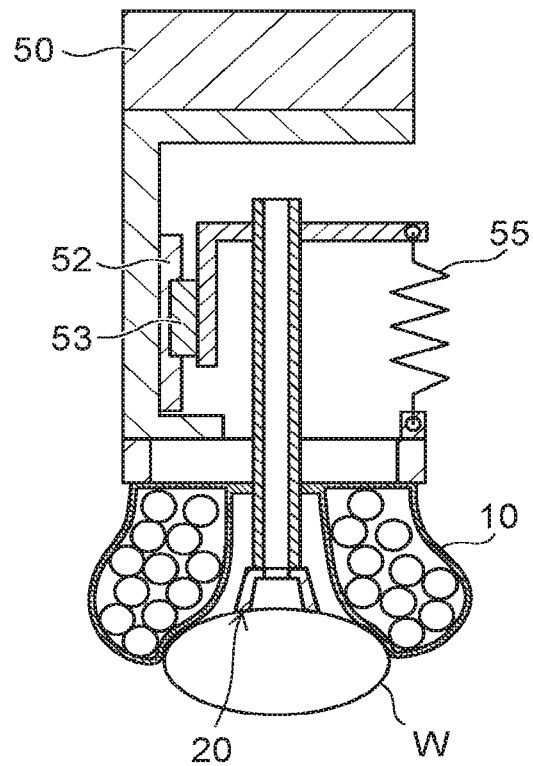
Figure 8C:
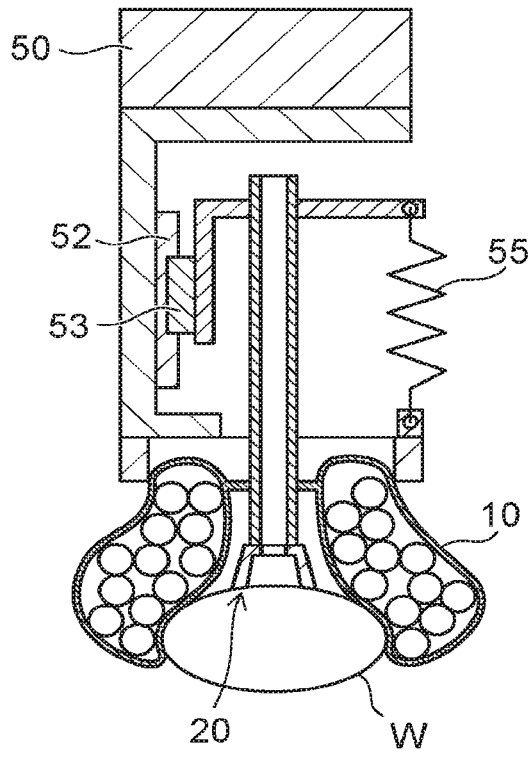

FIGS. 8A to 8C are schematic cross-sectional views illustrating the gripping mechanism of the gripping tool 3 according to the third embodiment. The first pipe 41 and the second pipe 42 are not illustrated in FIGS. 8A to 8C.

The gripping tool 3 is lowered from the initial state illustrated in FIG. 8A. As illustrated in FIG. 8B, the suction pad 20 and the gripper 10 sequentially contact the workpiece W. At this time, the gripper 10 deforms to conform to the shape of the workpiece W. The gripping tool 3 is lowered further from this state. As illustrated in FIG. 8C, the gripper 10 is pressed upward and widens sideward. The gripper 10 deforms to become larger.

As illustrated in FIG. 8C, the gripper 10 deforms more easily because the gripper 10 is deformable upward. The contact surface area between the gripper 10 and the workpiece W is higher compared to the state illustrated in FIG. 8B. The gripping force of the gripping tool 3 is improved thereby.

In the case where the gripper 10 deforms easily, the likelihood is high that the gripper 10 may deform and become sealed when the air is suctioned. However, according to the embodiment, the gripper 10 being sucked in can be prevented similarly to the first embodiment. Therefore, even when the gripper 10 deforms greatly, the gripping force of the gripping tool 3 can be increased further while preventing the gripper 10 from being sucked-in.

In the gripping tool 3 according to the third embodiment, similarly to the gripping tool 2 according to the second embodiment, the cylinder 56 may be provided instead of the guide mechanism 52, the sliding member 53, the fixing member 54, and the elastic member 55.

FOURTH EMBODIMENT

Figure 9:
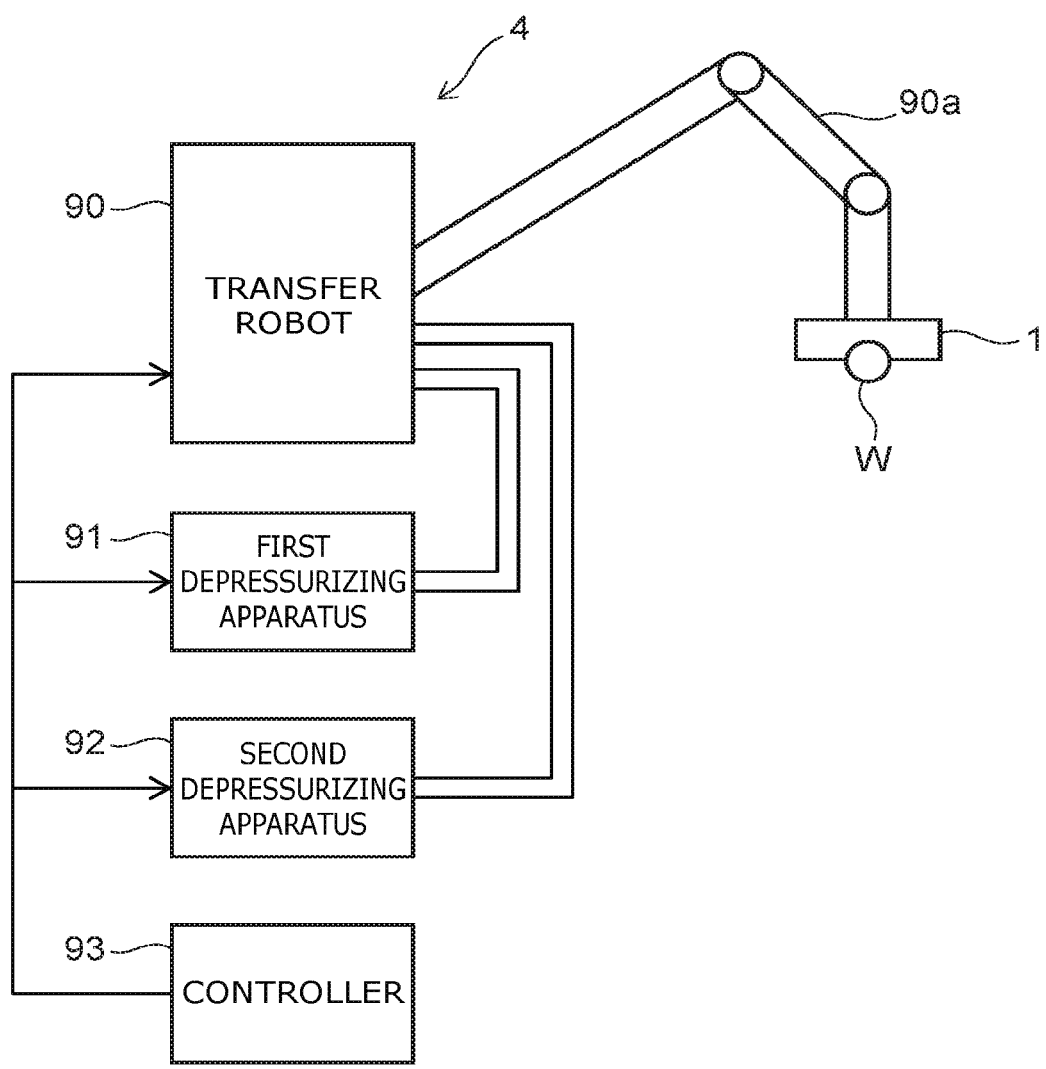
FIG. 9 is a schematic view illustrating a gripping system 4 according to a fourth embodiment.

FIG. 9 is a schematic view illustrating a gripping system 4 according to a fourth embodiment.

The gripping system 4 of the fourth embodiment includes the gripping tool 1, a transfer robot 90, a first depressurizing apparatus 91, a second depressurizing apparatus 92, and a controller 93.

The transfer robot 90 includes an arm 90a. For example, the arm 90a includes multiple joints. The gripping tool 1 is mounted to the tip of the arm 90a. The transfer robot 90 operates the arm 90a according to a command from the controller 93 and grips and transfers the workpiece W.

The first depressurizing apparatus 91 and the second depressurizing apparatus 92 include vacuum pumps. The first depressurizing apparatus 91 is connected to the first pipe 41 of the gripping tool 1 illustrated in FIG. 1. The second depressurizing apparatus 92 is connected to the second pipe 42 of the gripping tool 1. The first depressurizing apparatus 91 is driven according to a command from the controller 93. Thereby, the interior space of the gripper 10 is depressurized or opened to the atmosphere. The second depressurizing apparatus 92 is driven according to a command from the controller 93. Thereby, the air is suctioned via the suction pad 20; or the suction is stopped.

The controller 93 includes a CPU (Central Processing Unit), ROM (Read Only Memory), nonvolatile flash memory, etc. Various processing of the controller 93 is performed by the CPU. Various control algorithms, various constants, and the like that are necessary for the operation of the gripping system 4 are stored in the ROM. The transfer procedure, the transfer conditions, and the like of the workpiece W are stored as appropriate in the flash memory.

According to the transfer procedure stored in the flash memory, the controller 93 sends commands to control the operations of the transfer robot 90, the first depressurizing apparatus 91, and the second depressurizing apparatus 92.

Because the gripping system 4 includes the gripping tool 1 according to the first embodiment, the gripping force of the gripping tool 1 can be increased; and more diverse workpieces can be gripped.

The gripping system 4 according to the embodiment may include the gripping tool 2 or 3 according to the second or third embodiment instead of the gripping tool 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A gripping tool, comprising:
a gripper, the gripper being flexible, a granular material being provided in an interior of the gripper;
a suction pad including a pad portion and a pipe-shaped member and being surrounded with the gripper, the pad portion suctioning a workpiece, the pipe-shaped member being connected to the pad portion; and
a holder holding an outer perimeter of the gripper,
the suction pad being movable with respect to the gripper in a first direction, the first direction being from the pad portion toward the pipe-shaped member, and
when the gripper deforms by contacting the workpiece, a position in the first direction of the outer perimeter is between a position in the first direction of an upper end of the gripper and a position in the first direction of a lower end of the gripper.

2. The tool according to claim 1, wherein the tool grips the workpiece by causing the pad portion to suction the workpiece while moving the pad portion in the first direction with respect to the gripper, and by causing the gripper to contact the workpiece and depressurizing the interior of the gripper.

3. The tool according to claim 1, wherein the pad portion of the suction pad is positioned further in a second direction than the gripper in a state in which the pad portion does not contact the workpiece, the second direction being opposite to the first direction.

4. The tool according to claim 1, further comprising:
a guide mechanism fixed with respect to the gripper; and
a sliding member sliding along the guide mechanism in a direction of a line connecting the pad portion and the pipe-shaped member, the sliding member being fixed with respect to the suction pad,
when the suction pad is pressed onto the workpiece, the suction pad moves in the first direction with respect to the gripper, and the sliding member slides in the first direction along the guide mechanism.

5. The tool according to claim 1, wherein the suction pad is urged in a second direction with respect to the gripper in a state in which the suction pad does not contact the workpiece, the second direction being opposite to the first direction.

6. The tool according to claim 1, wherein
the gripper is deformable in a direction of a line connecting the pad portion and the pipe-shaped member.

7. The tool according to claim 1, wherein the pipe-shaped member pierces the gripper inside the holder.

8. The tool according to claim 1, further comprising:
a cylinder fixed with respect to the gripper; and
a piston provided inside the cylinder, the piston being slidable in a direction of a line connecting the pad portion and the pipe-shaped member,
the pipe-shaped member being linked to the piston,
when the suction pad is pressed onto the workpiece, the suction pad moves in the first direction with respect to the gripper by the piston sliding through the cylinder in the first direction.

9. A gripping system, comprising:
a robot mechanism including an arm;
the tool according to claim 1 mounted to a tip of the arm;
a first depressurizing apparatus connected to an interior space of the gripper and configured to depressurize the interior space;
a second depressurizing apparatus connected to the suction pad and configured to suction a gas via the suction pad; and
a controller controlling operations of the robot mechanism, the first depressurizing apparatus, and the second depressurizing apparatus.

10. A gripping tool, comprising:
a gripper, the gripper being flexible, a granular material being provided in an interior of the gripper;
a suction pad including a pad portion and a pipe-shaped member and being surrounded with the gripper; the pad portion suctioning a workpiece, the pipe-shaped member being connected to the pad portion;
a guide mechanism fixed with respect to the gripper; and
a sliding member sliding along the guide mechanism in a direction of a line connecting the pad portion and the pipe-shaped member, the sliding member being fixed with respect to the suction pad,
when the suction pad is pressed onto the workpiece, the suction pad moves in a first direction with respect to the gripper, and the sliding member slides in the first direction along the guide mechanism,
the first direction being from the pad portion toward the pipe-shaped member.

11. The tool according to claim 10, wherein the tool grips the workpiece by causing the pad portion to suction the workpiece while moving the pad portion in the first direction with respect to the gripper, and by causing the gripper to contact the workpiece and depressurizing the interior of the gripper.

12. The tool according to claim 10, wherein the pad portion of the suction pad is positioned further in a second direction than the gripper in a state in which the pad portion does not contact the workpiece, the second direction being opposite to the first direction.

13. The tool according to claim 10, herein the suction pad is urged in a second direction with respect to the gripper in a state in which the suction pad does not contact the workpiece, the second direction being opposite to the first direction.

14. The tool according to claim 10, further comprising a holder holding an outer perimeter of the gripper,
the gripper being deformable in a direction of a line connecting the pad portion and the pipe-shaped member.

15. The tool according to claim 14, wherein the pipe-shaped member pierces the gripper inside the holder.

16. The tool according to claim 15, wherein a portion of the gripper inside the holder is more deformable in the first direction than the outer perimeter of the gripper when the gripper deforms by contacting the workpiece.

17. The tool according to claim 10, further comprising:
a cylinder fixed with respect to the gripper; and
a piston provided inside the cylinder, the piston being slidable in a direction of a line connecting the pad portion and the pipe-shaped member,
the pipe-shaped member being linked to the piston,
when the suction pad is pressed onto the workpiece, the suction pad moves in the first direction with respect to the gripper by the piston sliding through the cylinder in the first direction.

18. A gripping system, comprising:
a robot mechanism including an arm;
the tool according to claim 10 mounted to a tip of the arm;
a first depressurizing apparatus connected to an interior space of the gripper and configured to depressurize the interior space;
a second depressurizing apparatus connected to the suction pad and configured to suction a gas via the suction pad; and
a controller controlling operations of the robot mechanism, the first depressurizing apparatus, and the second depressurizing apparatus.

* * * * *